Figure 1:
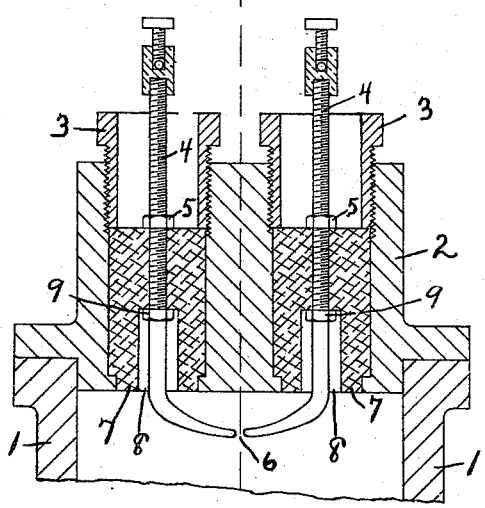
Figure 3:
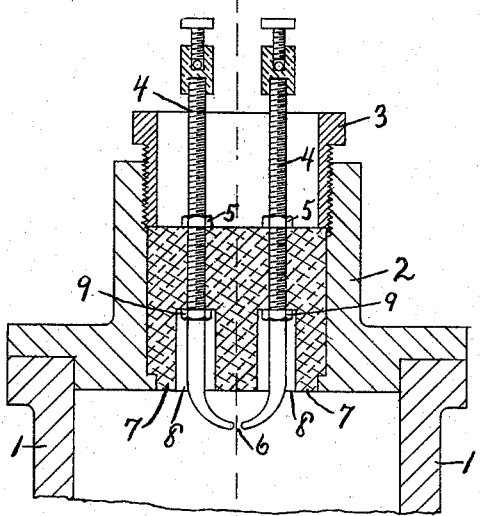
Figure 2:
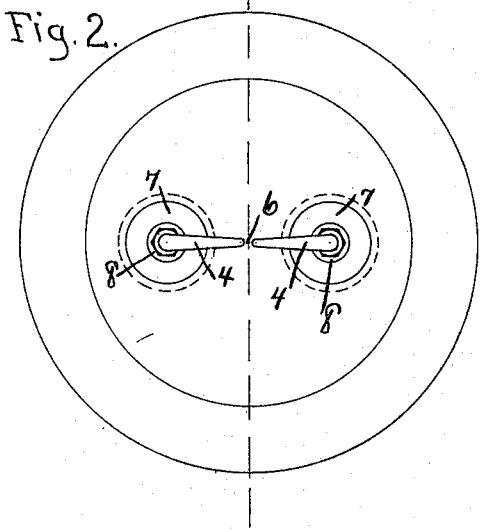
Figure 4:
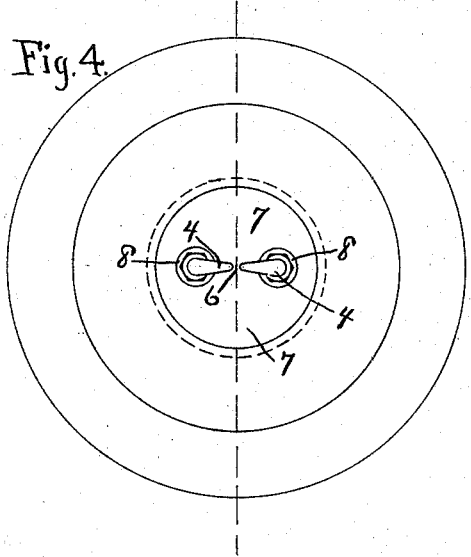
Figure 5:
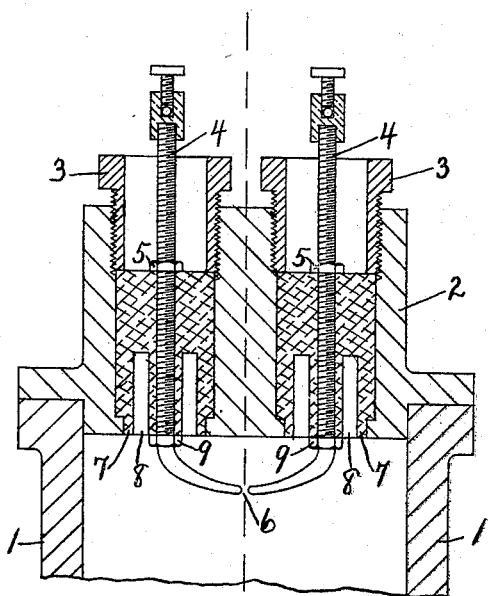
Figure 7:
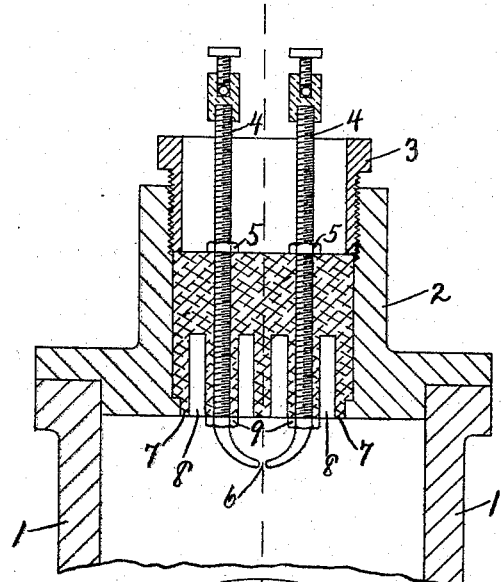
Figure 6:
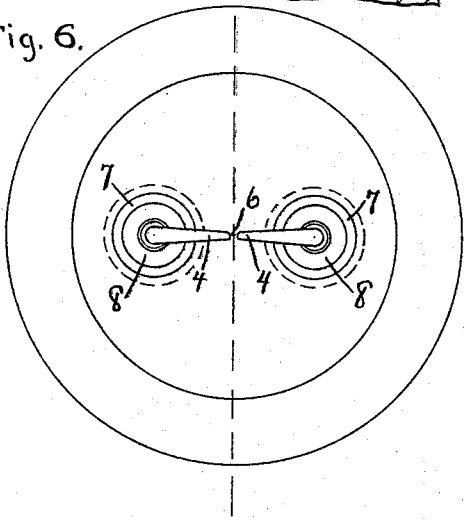
Figure 8:
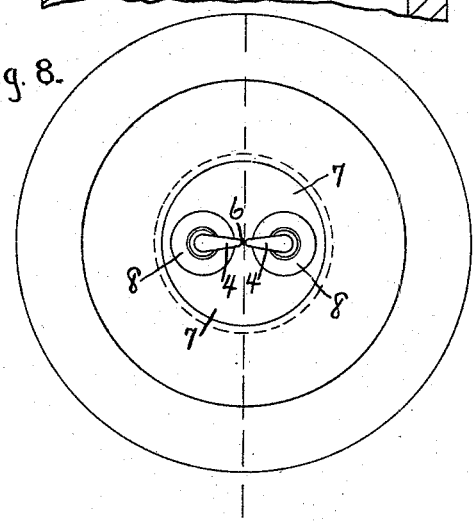

No. 612,701. Patented Oct. 18, 1898.
F. W. CANFIELD.
IGNITER OR SPARKER FOR GAS, OIL, OR VAPOR ENGINES.
(Application filed Aug. 5, 1897.)

(No Model.) 3 Sheets—Sheet 1.

Witnesses.
Jesse R. Ray.
Albert U. Mauzy

Inventor.
Frank W. Canfield.
by George R. Ray
Attorney.

No. 612,701.  
F. W. CANFIELD.  
IGNITER OR SPARKER FOR GAS, OIL, OR VAPOR ENGINES.  
(Application filed Aug. 5, 1897.)  
(No Model.)  
Patented Oct. 18, 1898.  
3 Sheets—Sheet 2.

Witnesses.  
Jesse R. Ray.  
Albert U. Mauzy.

Inventor.  
Frank W. Canfield.  
By George R. Ray  
Attorney.

THE NORRIS PETERS CO., PHOTO-LITHO., WASHINGTON, D. C.

No. 612,701. Patented Oct. 18, 1898.
F. W. CANFIELD.
IGNITER OR SPARKER FOR GAS, OIL, OR VAPOR ENGINES.
(Application filed Aug. 5, 1897.)

(No Model.) 3 Sheets—Sheet 3.

Witnesses.
Jesse R. Ray.
Albert U. Mauzy

Inventor.
Frank W. Canfield.
By George R. Ray
Attorney.

UNITED STATES PATENT OFFICE.

FRANK W. CANFIELD, OF MANISTEE, MICHIGAN.

IGNITER OR SPARKER FOR GAS, OIL, OR VAPOR ENGINES.

SPECIFICATION forming part of Letters Patent No. 612,701, dated October 18, 1898.

Application filed August 5, 1897. Serial No. 647,181. (No model.)

*To all whom it may concern:*

Be it known that I, FRANK W. CANFIELD, a citizen of the United States, residing at Manistee, in the county of Manistee and State of Michigan, have invented certain new and useful Improvements in Electric Igniters or Electric Sparkers for Gas, Oil, or Vapor Engines; and I do hereby declare that the following is a full, clear, and exact description of the invention, which will enable others skilled in the art to which it appertains to make and use the same.

My invention relates to improvements in electric igniters or electric sparkers as used for igniting or firing the charge of gas and air or atomized oil and air in whatever proportion to one another is found best to produce an explosion in the cylinder or firing-chamber of a gas, oil, or vapor engine for the purpose of generating power.

The object of my invention is to produce a method of insulating the electrodes of gas, oil, or vapor engines that will not foul injuriously, but be at all times perfect and in good reliable working order, thus causing the electric current from the generator to jump across the space between the points of the electrodes, and thereby causing a spark to ignite the charge of gas or vapor in the cylinder or firing-chamber of a gas, oil, or vapor engine. It is a well-known fact that up to this time the fouling of the insulation of the electrodes of electric sparkers in gas, oil, or vapor engines has been the greatest objection to the successful use of an electric current intense enough (whether generated by induction or otherwise) to pass between the points of stationary electrodes placed in the cylinders or firing-chambers of gas, oil, or vapor engines, said points not being in actual contact with each other. It is an established fact that when the insulation of the electrodes of a gas, oil, or vapor engine gets foul the intense current used will not pass between the points of the electrodes and make the required firing-spark, but follows the fouling of the insulation without making a spark of sufficient intensity to explode the charge of air and gas or other combustible, as required, thus causing the engine to stop; but when the insulations are not fouled and in good working order the electric current will jump across the space between the points of the electrodes, and thereby cause an electric spark of sufficient intensity to fire or explode the charge of vapor or mixture of gas and air in the cylinder or firing-chamber of a gas, oil, or vapor engine.

In the accompanying drawings like parts are represented by similar numerals.

Figures 1, 3, 5, 7, 9, and 11 show vertical sectional views of a cylinder-head with different forms of my device. Figs. 2, 4, 6, 8, 10, and 12 show plan views of same.

My improvement consists of a counterbore or recess around the electrode at a point where it enters the cylinder of a gas, oil, or vapor engine of such size and depth as will prevent the explosive mixture from cylinder or firing-chamber circulating into said cavity far enough to deposit the products of its combustion onto the insulator at the deepest part of the counterbore or recess. I find by actual test that a counterbore or recess for a quarter-inch diameter electrode works satisfactorily by being half-inch diameter by one and one-quarter inches deep; but a counterbore or recess half-inch diameter by three inches deep is still more satisfactory, for the reason that it more completely prevents circulation. A counterbore or recess of larger diameter than its depth will not prevent circulation and consequent fouling.

I accomplish the desired result in the following manner and as shown in the accompanying drawings, of which Figs. 1, 3, 5, 7, 9, and 11 are vertical sections, and Figs. 2, 4, 6, 8, 10, and 12 are plans, of my improved igniter.

In all the different figures, 1 shows the upper part of a cylinder of a gas, oil, or vapor engine, with the lower part removed.

2 shows cylinder-head.

3 shows binding-nuts for securing insulators to cylinder-head.

4 shows electrodes.

5 shows nuts for securing electrodes to insulator.

6 shows point where electric current should form firing-spark.

7 shows insulator.

Figure 9:
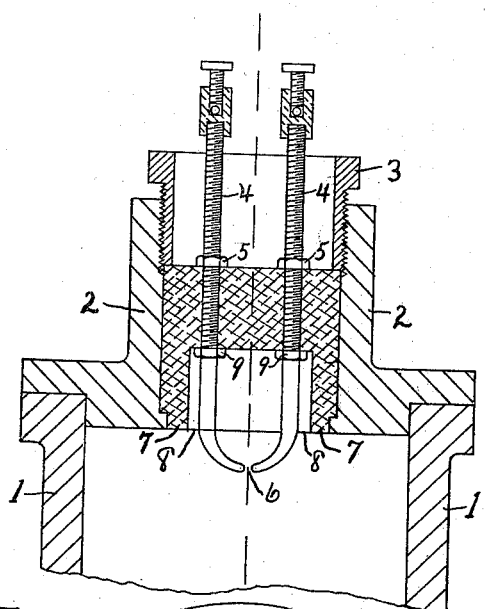
Figure 11:
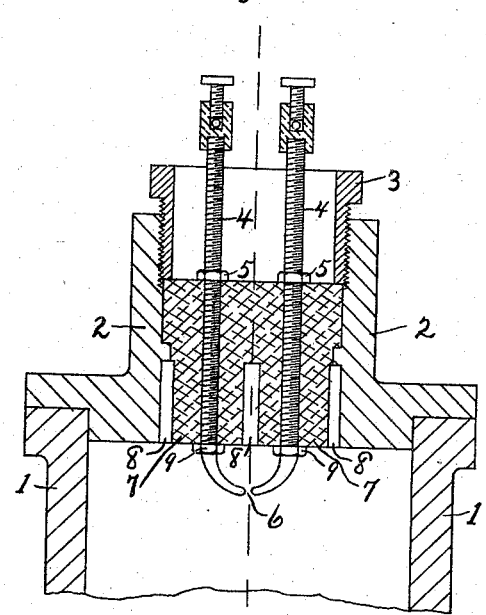
Figure 10:
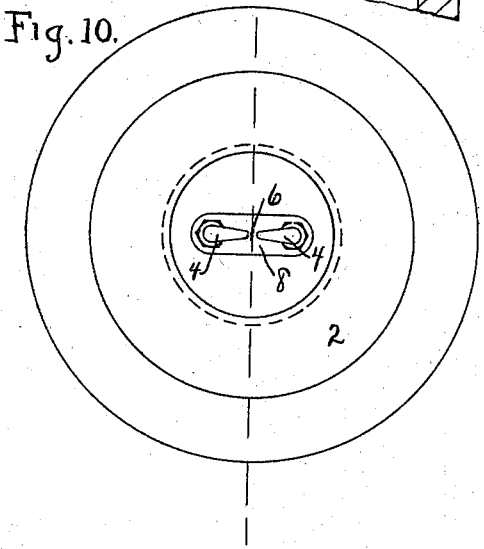
Figure 12:
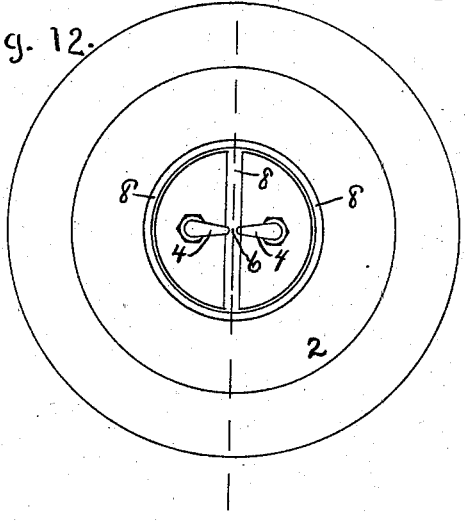

8 shows deep small-diameter counterbore or recess that prevents fouling of insulator or insulators. In Figs. 1, 2, 3, and 4 this counterbore or recess is shown as closely surrounding the electrode and having a depth of about three times its diameter. In Figs. 5, 6, 7, and 8 this counterbore or recess is formed in the insulator and is annular, surrounding the electrode, but separated from the electrode and cylinder-head by a portion of the insulator. In Figs. 9 and 10 the counterbore or recess is made oblong, with semicircular ends, and surrounds both electrodes. In Figs. 11 and 12 the counterbore or recess is made annular, with a central division which separates the two electrodes. I have thus shown several ways of forming the counterbore or recess for my improved insulator; but it is immaterial what shape or form the counterbore or recess is made in, so that it surrounds the electrode and of such size and depth that it prevents the circulation of the explosive mixture into the deepest part of same.

9 shows collar for holding electrode in place.

Having fully described my invention, what I claim as new, and desire to secure by Letters Patent, is—

1. In a gas, oil or vapor engine igniter or sparker a recess or counterbore around the electrode or electrodes and above its or their sparking-points when said electrodes are used vertically, for the purpose of preventing an injurious accumulation of the products of combustion or other foul matter on the insulation of said electrodes, substantially as and for the purpose set forth.

2. In a gas, oil or vapor engine igniter or sparker a recess or counterbore of such size and depth as to prevent the explosive mixture used in the cylinder from circulating into said counterbore or recess far enough to come in contact with its deepest part around the electrode or electrodes at or near the point where said electrode or electrodes leave the insulator to enter the cylinder or firing-chamber, for the purpose of preventing an injurious accumulation of the products of combustion or other foul matter on the insulation of said electrodes, substantially as and for the purpose set forth.

In witness whereof I have hereunto set my hand in the presence of two witnesses.

FRANK W. CANFIELD.

In presence of—
ALBERT U. MAUZY,
TOM RAY.